United States Patent

Twaits, Jr.

[11] Patent Number: 5,899,466
[45] Date of Patent: May 4, 1999

[54] RACK LOADER

[76] Inventor: Douglas L. Twaits, Jr., R.R. 1 Box 1197, Dingmans Ferry, Pa. 18328

[21] Appl. No.: 09/001,438

[22] Filed: Dec. 31, 1997

[51] Int. Cl.⁶ .................................................. B62B 1/04
[52] U.S. Cl. .................................. 280/47.18; 280/47.24; 414/537
[58] Field of Search ................... 414/537, 340, 414/345, 346, 373, 538; 280/32, 47.131, 47.18, 47.24; 14/69.5, 72.5

[56] References Cited

U.S. PATENT DOCUMENTS

| | | | |
|---|---|---|---|
| 3,687,314 | 8/1972 | Haugland | 414/537 X |
| 3,782,748 | 1/1974 | Poland | 280/47.131 X |
| 3,820,806 | 6/1974 | Cline et al. | 280/32 X |
| 3,837,663 | 9/1974 | Ness | 14/69.5 X |
| 3,854,747 | 12/1974 | Johnston | 280/47.24 X |
| 3,896,904 | 7/1975 | Walker | 280/47.24 X |
| 3,913,762 | 10/1975 | Alexander | 280/47.24 X |
| 5,118,245 | 6/1992 | Dunkel | 414/537 |
| 5,794,291 | 8/1998 | Olaussen et al. | 414/537 X |

*Primary Examiner*—James W. Keenan

[57] ABSTRACT

A small vehicle loader is provided including a frame formed from a plurality of bars. A pair of wheels are mounted to the frame between a central extent and a front end thereof. A pair of stoppers are coupled to the frame to the rear of the wheels and extended downwardly from the frame.

5 Claims, 2 Drawing Sheets

RACK LOADER

BACKGROUND OF THE INVENTION

1. Field of the Invention

The present invention relates to loaders and more particularly pertains to a new rack loader for loading various small vehicles such as ATVs, snowmobiles, watercraft and the like on to a recipient surface such as a bed of a large vehicle.

2. Description of the Prior Art

The use of loaders is known in the prior art. More specifically, loaders heretofore devised and utilized are known to consist basically of familiar, expected and obvious structural configurations, notwithstanding the myriad of designs encompassed by the crowded prior art which have been developed for the fulfillment of countless objectives and requirements.

Known prior art loaders include U.S. Pat. No. 3,977,545; U.S. Pat. No. 4,212,580; U.S. Pat. No. 5,281,075; U.S. Pat. No. 3,976,209; U.S. Pat. No. 4,960,356; and U.S. Des. Pat. No. 331,128.

In these respects, the rack loader according to the present invention substantially departs from the conventional concepts and designs of the prior art, and in so doing provides an apparatus primarily developed for the purpose of loading various small vehicles such as ATVs, snowmobiles, watercraft and the like on to a recipient surface such as a bed of a large vehicle.

SUMMARY OF THE INVENTION

In view of the foregoing disadvantages inherent in the known types of loaders now present in the prior art, the present invention provides a new rack loader construction wherein the same can be utilized for loading various small vehicles such as ATVs, snowmobiles, watercraft and the like on to a recipient surface such as a bed of a large vehicle.

The general purpose of the present invention, which will be described subsequently in greater detail, is to provide a new rack loader apparatus and method which has many of the advantages of the loaders mentioned heretofore and many novel features that result in a new rack loader which is not anticipated, rendered obvious, suggested, or even implied by any of the prior art loaders, either alone or in any combination thereof.

To attain this, the present invention generally comprises a central frame having a pair of longitudinal assemblies. Each of such longitudinal assemblies includes a pair of spaced and parallel linear bars each having a front end and a rear end. As shown in FIG. 2, a lateral assembly is provided including a plurality of telescoping parallel linear bars each having an end coupled to a lower surface of the bars of the longitudinal assemblies. The longitudinal assemblies are thus maintained in a parallel relationship and may be selectively distanced from each other. The bars of the lateral assembly include a plurality of rear bars spacedly mounted between a central extent and the rear end of the bars of the longitudinal assemblies. Further, a single front bar is mounted between the front end of the bars of the longitudinal assemblies. Associated therewith is an auxiliary frame including a pair of longitudinal assemblies. The longitudinal assemblies of the auxiliary frame each include a pair of spaced and parallel linear bars each having a front end and a rear end and a length less than ⅛ that of the longitudinal assemblies of the central frame. The auxiliary frame further includes a lateral assembly with a plurality of telescoping parallel linear bars each having an end coupled to a lower surface of the longitudinal assemblies of the auxiliary frame. As shown in FIG. 2, the front ends of the longitudinal assemblies of the auxiliary frame are telescopingly mated with the rear ends of the longitudinal assemblies of the central frame. By this structure, the longitudinal assemblies of the auxiliary frame are maintained in parallel relationship and may be selectively distanced from each other coincidentally with those of the central frame. The auxiliary frame may further be distanced from the central frame. Next provided is a pair of wheel assemblies each including a pair of longitudinal half bars each of which is mounted inwardly of an associated one of the longitudinal assemblies of the central frame. Such half bars each extend between the front bar and one of the rear bars of the lateral assembly. A pair of axles are each connected between the longitudinal half bar and an innermost bar of the corresponding longitudinal assembly of the central frame. Further, a pair of wheels are rotatably coupled about the axles. Also included is a hand operated winch mounted to the front bar of the lateral assembly for cranking a line having a hook mounted on an end thereof. FIG. 4 shows a pair of stopper blocks each mounted between the bars of an associated one of the longitudinal assemblies of the central frame. The stoppers are positioned to the rear of and adjacent to the associated wheel. The stopper blocks extend downwardly from the central frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rack loader apparatus and method which has many of the advantages of the loaders mentioned heretofore and many novel features that result in a new rack loader which is not anticipated, rendered obvious, suggested, or even implied by any of the prior art loaders, either alone or in any combination thereof.

It is another object of the present invention to provide a new rack loader which may be easily and efficiently manufactured and marketed.

It is a further object of the present invention to provide a new rack loader which is of a durable and reliable construction.

An even further object of the present invention is to provide a new rack loader which is susceptible of a low cost of manufacture with regard to both materials and labor, and which accordingly is then susceptible of low prices of sale to the consuming public, thereby making such rack loader economically available to the buying public.

Still yet another object of the present invention is to provide a new rack loader which provides in the apparatuses and methods of the prior art some of the advantages thereof, while simultaneously overcoming some of the disadvantages normally associated therewith.

Still another object of the present invention is to provide a new rack loader for loading various small vehicles such as ATVs, snowmobiles, watercraft and the like on to a recipient surface such as a bed of a large vehicle.

Even still another object of the present invention is to provide a new rack loader that includes a frame formed from a plurality of bars. A pair of wheels are mounted to the frame between a central extent and a front end thereof. A pair of stoppers are coupled to the frame to the rear of the wheels and extended downwardly from the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
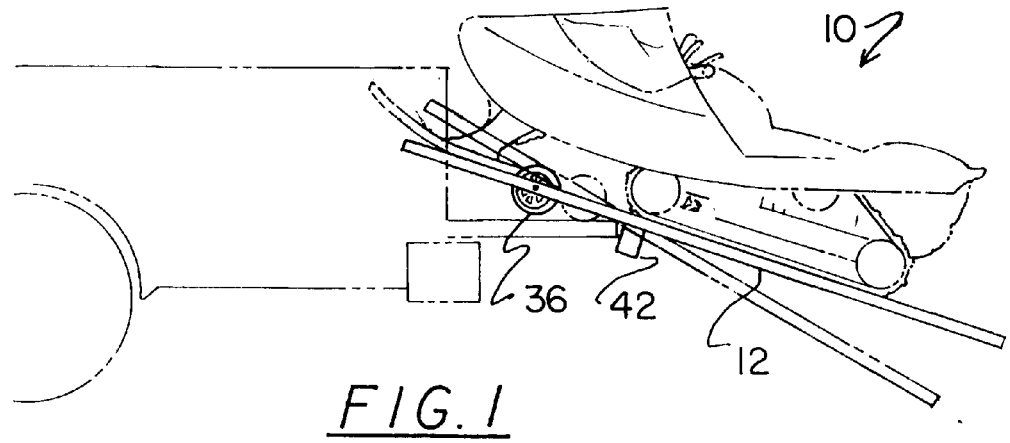
FIG. 1 is a side view of a new rack loader according to the present invention.

With reference now to the drawings, and in particular to FIGS. 1 through 5 thereof, a new rack loader embodying the principles and concepts of the present invention and generally designated by the reference numeral 10 will be described.

Figure 2:
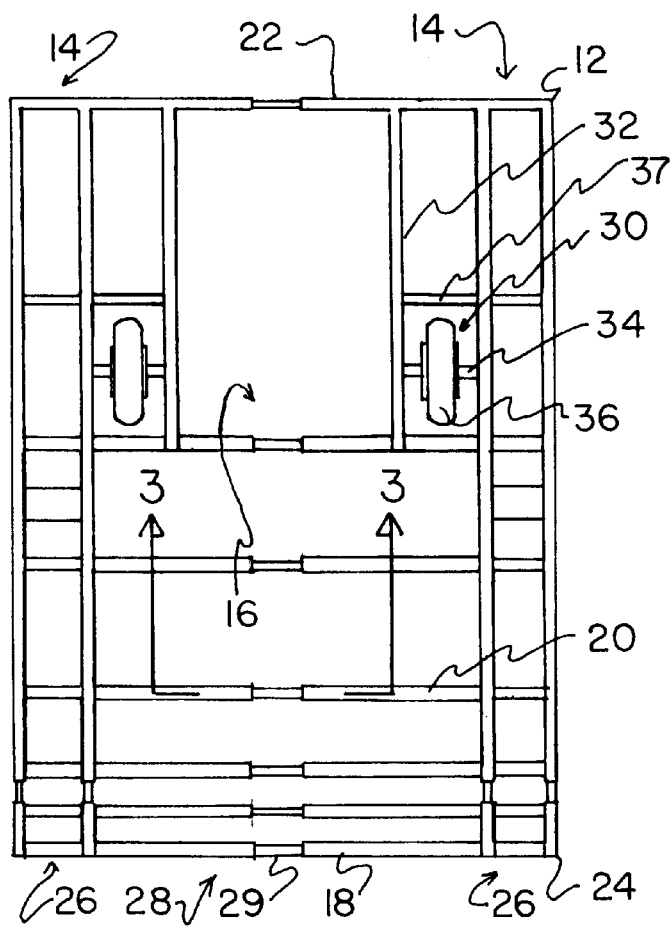
FIG. 2 is a top view of the present invention.
Figure 3:
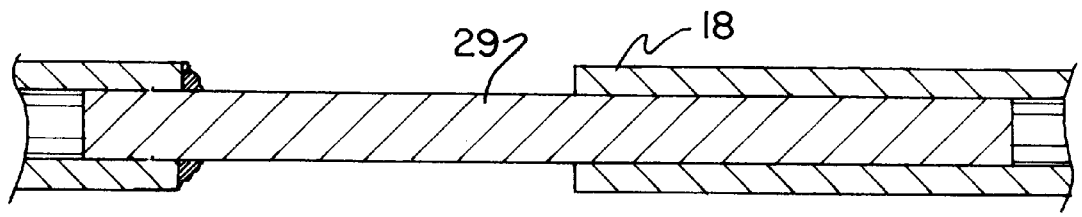
FIG. 3 is a cross-sectional view of the present invention taken along line 3—3 shown in FIG. 2.
Figure 4:
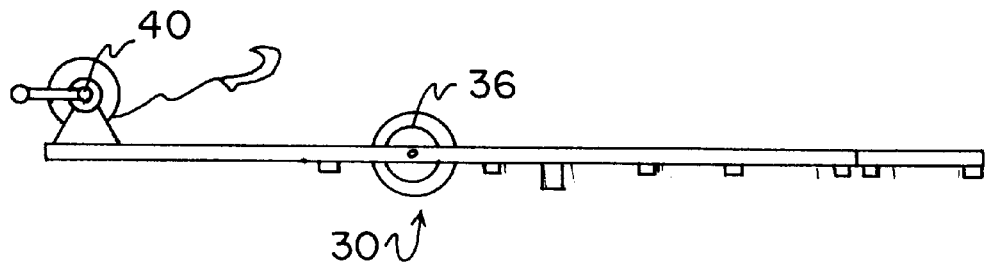
FIG. 4 is a side view of the present invention with an optional winch.
Figure 5:
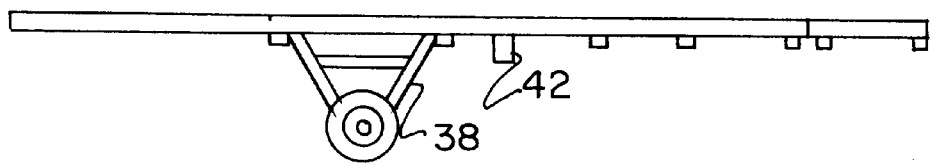
FIG. 5 is a side view of the present invention with an alternate positioning of the wheels.

The present invention, designated as numeral 10, includes a central frame 12 having a pair of longitudinal assemblies 14. Each of such longitudinal assemblies includes a pair of spaced and parallel linear bars each having a front end and a rear end. As shown in FIG. 2, a lateral assembly 16 is provided including a plurality of telescoping parallel linear bars 18 each having an end coupled to a lower surface of the bars of the longitudinal assemblies. The longitudinal assemblies are thus maintained in a parallel relationship and may be selectively distanced from each other. It should be noted that when the longitudinal assemblies are minimally distanced, the spacing between the bars of each longitudinal assembly is less than $\frac{1}{3}$ the distance between the longitudinal assemblies themselves. The bars of the lateral assembly include a plurality of rear bars 20 spacedly mounted between a central extent and the rear end of the bars of the longitudinal assemblies. Further, a single front bar 22 is mounted between the front end of the bars of the longitudinal assemblies.

Associated therewith is an auxiliary frame 24 including a pair of longitudinal assemblies 26. The longitudinal assemblies of the auxiliary frame each include a pair of spaced and parallel linear bars each having a front end and a rear end and a length less than $\frac{1}{8}$ that of the longitudinal assemblies of the central frame. The auxiliary frame further includes a lateral assembly 28 with a plurality of telescoping parallel linear bars each having an end coupled to a lower surface of the longitudinal assemblies of the auxiliary frame. As shown in FIG. 2, the front ends of the longitudinal assemblies of the auxiliary frame are telescopingly mated with the rear ends of the longitudinal assemblies of the central frame.

By this structure, the longitudinal assemblies of the auxiliary frame are maintained in parallel relationship and may be selectively distanced from each other coincidentally with those of the central frame. The auxiliary frame may further be distanced from the central frame. In the case of both the central and auxiliary frame, the bars of the lateral assemblies each including a pair of hollow members one of which has a cylindrical rod 29 fixedly coupled therein, wherein the rod is telescopingly mated with the other member. See FIG. 3.

Next provided is a pair of wheel assemblies 30 each including a pair of longitudinal half bars 32 each of which is mounted inwardly of an associated one of the longitudinal assemblies of the central frame. Such half bars each extend between the front bar and one of the rear bars of the lateral assembly. A pair of axles 34 are each connected between the longitudinal half bar and an innermost bar of the corresponding longitudinal assembly of the central frame. Further, a pair of wheels 36 are rotatably coupled about the axles. For supporting purposes, a plurality of lateral supports 37 may be mounted between the bars of the longitudinal assemblies and the corresponding longitudinal half bar. In an alternate embodiment, the axles are mounted below a plane in which the frame resides via a pair of triangular supports 38. Note FIG. 5.

Also included as an option is a hand operated winch 40 mounted to the front bar of the lateral assembly for cranking a line having a hook mounted on an end thereof. As will soon become apparent, the winch is especially useful when the present invention is used in combination with watercraft. FIG. 1 shows a pair of stopper blocks 42 each mounted between the bars of an associated one of the longitudinal assemblies of the central frame. The stoppers are positioned to the rear of and adjacent to the associated wheel. The stopper blocks extend downwardly from the central frame. Such stoppers are preferably distanced less than $\frac{1}{8}$ the length of the frame from the wheels.

During use, the central frame may be mounted in an angled orientation on an elevated recipient surface. A front edge of each of the stopper blocks abuts a rear edge of the recipient surface in such orientation. Further, the wheels extend upwardly from the stoppers and rest on the recipient surface to define a fulcrum such that the small vehicle may be driven or winched up the auxiliary and central frames past the fulcrum. This effects the leveling the frames so that small vehicles may be completely loaded on the recipient surface. As an option, a user may simply use the rear bars for leverage to lift the small vehicle when it approaches the fulcrum point.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A small vehicle loader comprising, in combination:

a central frame including a pair of longitudinal assemblies each including a pair of spaced and parallel linear bars each having a front end and a rear end and a lateral assembly including a plurality of telescoping parallel linear bars each having an end coupled to the bars of the longitudinal assemblies such that the longitudinal assemblies are maintained in a parallel relationship and may be selectively distanced from each other, wherein the bars of the lateral assembly include a plurality of rear bars spacedly mounted between a central extent and the rear end of the bars of the longitudinal assemblies and further a single front bar mounted between the front end of the bars of the longitudinal assemblies;

an auxiliary frame including a pair of longitudinal assemblies each including a pair of spaced and parallel linear bars each having a front end and a rear end and a length less than ⅛ that of the longitudinal assemblies of the central frame, the auxiliary frame further including a lateral assembly including a plurality of telescoping parallel linear bars each having an end coupled to the longitudinal assemblies of the auxiliary frame, wherein the front ends of the longitudinal assemblies of the auxiliary frame are telescopingly mated with the rear ends of the longitudinal assemblies of the central frame, whereby the longitudinal assemblies of the auxiliary frame are maintained in parallel relationship and may be selectively distanced from each other coincidentally with those of the central frame and further distanced from the central frame;

a pair of wheel assemblies each including a pair of longitudinal half bars each of which is mounted inwardly of an associated one of the longitudinal assemblies of the central frame and extending between the front bar and one of the rear bars of the lateral assembly with a pair of axles each connected between the longitudinal half bar and an innermost bar of the corresponding longitudinal assembly of the central frame, whereby a pair of wheels are rotatably coupled about the axles;

a hand operated winch mounted to the front bar of the lateral assembly for cranking a line having a hook mounted on an end thereof; and a pair of stopper blocks each mounted between the bars of an associated one of the longitudinal assemblies of the central frame to the rear of and adjacent to the associated wheel, wherein the stopper blocks extend downwardly from the central frame;

whereby the central frame may be mounted in an angled orientation on an elevated recipient surface with a front edge of each of the stopper blocks abutting a rear edge of the recipient surface and the wheels extending upwardly therefrom and resting on the recipient surface to define a fulcrum such that a small vehicle may be driven up the auxiliary and central frames past the fulcrum thereby leveling the frames so that the small vehicle may be completely loaded on the recipient surface.

2. A small vehicle loader comprising:

a frame formed from a plurality of bars;

a pair of wheels mounted to the frame between a central extent and a front end thereof; and a pair of stopper blocks mounted to the frame to the rear of the wheels and extending downwardly from the frame;

wherein the frame includes a central frame and an auxiliary frame, the central frame including a pair of longitudinal assemblies each including a pair of spaced and parallel linear bars each having a front end and a rear end and a lateral assembly including a plurality of telescoping parallel linear bars each having an end coupled to the bars of the longitudinal assemblies such that the longitudinal assemblies are maintained in a parallel relationship and may be selectively distanced from each other the auxiliary frame including a pair of longitudinal assemblies each including a pair of spaced and parallel linear bars each having a front end and a rear end, the auxiliary frame further including a lateral assembly having a plurality of telescoping parallel linear bars each having an end coupled to the longitudinal assemblies of the auxiliary frame wherein the front ends of the longitudinal assemblies of the auxiliary frame are telescopingly mated with the rear ends of the longitudinal assemblies of the central frame, whereby the longitudinal assemblies of the auxiliary frame are maintained in parallel relationship and may be selectively distanced from each other coincidentally with those of the central frame and further distanced from the central frame;

wherein the wheels are each mounted to one of the longitudinal assemblies of the central frame.

3. A small vehicle loader as set forth in claim 2 wherein an axis of each wheel is situated in coplanar relationship with the frame.

4. A small vehicle loader as set forth in claim 2 wherein an axis of each wheel is situated below the frame.

5. A small vehicle loader as set forth in claim 2 wherein a hand operated winch is mounted to the frame for cranking a line having a hook means mounted on an end thereof.

* * * * *